(12) United States Patent
Wu et al.

(10) Patent No.: US 11,734,391 B2
(45) Date of Patent: Aug. 22, 2023

(54) METHOD AND APPARATUS FOR PROCESSING ASTRONOMICAL SURVEY DATA, AND STORAGE MEDIUM

(71) Applicant: National Astronomical Observatories, Chinese Academy of Sciences, Beijing (CN)

(72) Inventors: Kefei Wu, Beijing (CN); Ali Luo, Beijing (CN); Dongwei Zhao, Beijing (CN); Xiao Kong, Beijing (CN); Yongheng Zhao, Beijing (CN)

(73) Assignee: National Astronomical Observatories, Chinese Academy of Sciences, Beijing (CN)

( * ) Notice: Subject to any disclaimer, the term of this patent is extended or adjusted under 35 U.S.C. 154(b) by 405 days.

(21) Appl. No.: 16/937,844

(22) Filed: Jul. 24, 2020

(65) Prior Publication Data
US 2021/0011886 A1 Jan. 14, 2021

(30) Foreign Application Priority Data
May 24, 2019 (CN) .......................... 201910437719.4

(51) Int. Cl.
*G06F 11/30* (2006.01)
*G06F 18/2415* (2023.01)
(Continued)

(52) U.S. Cl.
CPC ........ *G06F 18/2415* (2023.01); *G06F 16/116* (2019.01); *G06F 16/182* (2019.01); *G06F 2218/12* (2023.01); *G06Q 50/26* (2013.01)

(58) Field of Classification Search
CPC ... G06F 16/182; G06F 17/16; G06K 9/00536; H04L 67/10
See application file for complete search history.

(56) References Cited

U.S. PATENT DOCUMENTS

| 8,024,152 B2 | 9/2011 | Zhang et al. |
| 2014/0330536 A1* | 11/2014 | Chen .......................... G06F 9/46 |
| | | 702/181 |

FOREIGN PATENT DOCUMENTS

| CN | 103810140 | 5/2014 |
| CN | 107291751 | 10/2017 |

OTHER PUBLICATIONS

Chen et al., "User support to Guoshoujing Telescope (LAMOST)," Proc. SPIE 8448, Observatory Operations: Strategies, Processes, and Systems IV, 84480C (Sep. 13, 2012).*

(Continued)

*Primary Examiner* — Phuong Huynh
(74) *Attorney, Agent, or Firm* — Hamre, Schumann, Mueller & Larson, P.C.

(57) ABSTRACT

The present disclosure provides a method and apparatus for processing astronomical survey data. The method comprises: a data distribution step: delivering a spectral data file to be processed to a distributed file system, dividing the spectral data file into a plurality of data blocks, and distributing the data blocks to computing nodes; a data computing step: performing a spectral classification of spectra to be measured in the data blocks, with a template matching method; the data computing step comprises: reading template spectra, and extracting template universal operators; reading the spectra to be measured; performing spectral matching, and computing Chi-square error values for flow rate values of the template spectra multiplied by the polynomial and flow rate values of the spectra to be measured; and finding corresponding minimum Chi-square error and corresponding redshift for each of the template spectra, so as to determine classifications of the spectra to be measured.

11 Claims, 4 Drawing Sheets

(51) Int. Cl.
*G06F 16/182* (2019.01)
*G06F 16/11* (2019.01)
*G06Q 50/26* (2012.01)

(56) References Cited

OTHER PUBLICATIONS

Duan et al., "Automated spectral classification using template matching," Research in Astron. Astrophys. vol. 9, No. 3, 341-348 (2009).*
Hutchinson et al., "Redshift Measurement and Spectral Classification for eBOSS Galaxies With the Redmonster Software," The Astronomical Journal, (2016).*
First Chinese Office Action and Search Report, issued in the corresponding Chinese patent application No. 201910437719.4, dated Mar. 26, 2020, 10 pages.
Supplementary Search Report, issued in the corresponding Chinese patent application No. 201910437719.4, dated Apr. 27, 2020, 3 pages.
Weiyang et al., "The research of data mining technologies based on Handoop on the application of photometric redshifts", Application of Electronic Technique, China Academic Journal Electronic Publishing House, vol. 42, No. 9, pp. 111-114, 2016 (English Abstract enclosed).

\* cited by examiner

METHOD AND APPARATUS FOR PROCESSING ASTRONOMICAL SURVEY DATA, AND STORAGE MEDIUM

CROSS-REFERENCE TO RELATED APPLICATION

This application claims priority to Chinese Patent Application No. 201910437719.4, filed on May 24, 2019, which is hereby incorporated by reference in its entirety.

TECHNICAL FIELD

The present disclosure relates to the technical field of astronomical data processing, and particularly to a method and system for processing astronomical survey data, and a storage medium.

BACKGROUND ART

With the big data era's coming, the astronomical data processing enters a new period. For the processing of astronomical data in an order of magnitude of Terabyte (TB) or even Petabyte PB, it is increasingly difficult to employ the traditional data processing methods and the traditional computing frameworks. Guo Shoujing Telescope (Large Sky Area Multi-Object Fiber Spectroscopy Telescope, LAMOST) can obtain the spectra of 4000 celestial bodies at the same time in one observation, and it is a sky survey telescope with the highest spectral acquisition rate in the world. This telescope is responsible for the general survey of stars, and has been in operation for many years, with the delivered spectral data accumulated to be more than 10 million pieces. The traditional processing methods are to use high-performance workstations to process these data, as illustrated in FIG. 1. In FIG. 1, a management workstation 2 manages sky survey data (also called "survey data" for short) by transmitting the survey data from a 3-unit (3U) storage server 3 to one or more computing workstations 4 through an internal network for computation, and a user terminal 1 sends an operation instruction to the management workstation 2. One-dimensional spectral processing of the survey data of Guo Shoujing telescope performs a spectral classification by template matching. In the traditional technology, an amount of computation caused by template matching which uses a Singular Value Decomposition (SVD) to determine coefficients of polynomial is directly related to the number of templates, and the workload is multiplied as the number of templates increases, which is a terrible consequence when processing the big data. With regard to the 10 million pieces of survey spectra of Guo Shoujing telescope, it needs about 5,000 hours for a single server to process them once. It needs about 160 hours when the spectra are distributed to 32 servers for processing at the same time, and the processing cost (the time cost and the hardware cost) is very high. If 100 templates are added, the processing time will be extended by 100 times, and reprocessing is required if there is any problem during the processing, so the consequence is even more unimaginable. The number of templates increases continuously as the sky survey spectrum data increase gradually, and the traditional processing methods can only increase the operation cost while the computation is increasingly difficult.

SUMMARY OF THE DISCLOSURE

In view of the above problem, the present disclosure provides a method and apparatus for processing astronomical telescope survey data, and a storage medium, so as to quickly and effectively process the survey data.

In one aspect, the present disclosure provides a method for processing astronomical telescope survey data, comprising:

a data distribution step: delivering a spectral data file to be processed to a distributed file system, dividing the spectral data file to be processed into a plurality of data blocks, and distributing the plurality of data blocks to a plurality of computing nodes;

a data computing step: using a distributed computing framework to perform a spectral classification of spectra to be measured in the data blocks at each of the computing nodes, with a template matching method in which template spectra are superposed with a polynomial and then matched with the spectra to be measured, and storing a spectral classification result; the template matching method satisfies the following formula:

$f_m \times \Sigma_{i=0}^{n} \beta_i W^i = f_o$, which is expressed with the following matrix:

$$X \times B = f_o;$$

Wherein $f_o$ represents a flow rate value of a spectrum to be measured, $f_m$ represents a flow rate value of a template spectrum, and $\Sigma_{i=0}^{n}\beta_i W^i$ represents the polynomial, wherein $\beta_i$ represents a coefficient of the polynomial, $W^i$ represents a variable in a wavelength direction in the polynomial, n represents an order of the polynomial; X is a matrix expression of a product of the variables $W^i$ in the wavelength direction in the polynomial and $f_m$, and B is a matrix expression of the coefficient $\beta_i$ in the polynomial;

wherein the data computing step comprises:

reading the template spectra, and extracting a template universal operator which comprises at least one of the following operators: a value of a matrix $X=[f_m W^n\ f_m W^{n-1} \ldots f_m W^2\ f_m W\ f_m]$, a value of a transposition $X^T$ of the matrix X, and a value of a product $X^T X$ of the transposition $X^T$ and the matrix X;

reading the spectra to be measured;

performing spectral matching by redshifting the spectra and translating redshifts in a predetermined shift step length, and computing Chi-square error values between flow rate values of the template spectra multiplied by the polynomial and flow rate values of the spectra to be measured; and finding corresponding minimum Chi-square error and corresponding redshift for each of the template spectra, so as to determine classifications of the spectra to be measured.

In one embodiment, the method further comprises: a data preprocessing step: extracting information of survey file data, and formatting the extracted information to obtain the spectral data file to be processed.

In one embodiment, the data preprocessing step comprises: reading survey file data in a format of FITS, and extracting FITS header information and spectral data, wherein the extracted information is formatted and merged.

In one embodiment, the method further comprises: storing the extracted template universal operators as a broadcast variable, and transmitting to each of the computing nodes.

In one embodiment, finding corresponding minimum Chi-square error and corresponding redshift for each of the template spectra comprises: for each of the template spectra, finding a redshift point with a minimum Chi-square error and a predetermined number of redshift points nearby with Chi-square errors for Gaussian fitting; and obtaining a Gaussian fitting curve which best meets Gaussian curve, and taking corresponding template as the template matching with the spectra to be measured, to obtain the minimum Chi-square error and corresponding redshift value based on the lowest point of the Gaussian fitting curve of the matched template.

In one embodiment, the distributed computing framework is a Spark computing framework.

In another aspect, the present disclosure provides an apparatus for processing astronomical survey data, comprising a processor and a memory, wherein the processor is configured to implement the following steps when executing computer program code stored on the memory:

performing a spectral classification of spectra to be measured in data blocks, with a template matching method in which template spectra are superposed with a polynomial and then matched with the spectra to be measured, and storing a spectral classification result; the template matching method satisfies the following formula:

$f_m \times \Sigma_{i=0}^{n} \beta_i W^i = f_o$, which is expressed with the following matrix:

$$X \times B = f_o;$$

Wherein $f_o$ represents a flow rate value of a spectrum to be measured, $f_m$ represents a flow rate value of a template spectrum, and $\Sigma_{i=0}^{n} \beta_i W^i$ represents the polynomial, wherein $\beta_i$ represents a coefficient of the polynomial, $W^i$ represents a variable in a wavelength direction in the polynomial, n represents an order of the polynomial; X is a matrix expression of a product of the variables $W^i$ and $f_m$ in the wavelength direction in the polynomial, and B is a matrix expression of the coefficient $\beta_i$ in the polynomial;

performing a spectral classification of spectra to be measured in data blocks comprises:

reading the template spectra, and extracting template universal operators which comprise at least one of the following operators: a value of a matrix $X = [f_m W^n\ f_m W^{n-1} \ldots f_m W^2\ f_m W\ f_m]$, a value of a transposition $X^T$ of the matrix X, and a value of a product $X^T X$ of the transposition $X^T$ and the matrix X;

reading the spectra to be measured;

performing spectral matching by redshifting the spectra and translating redshifts in a predetermined shift step length, and computing Chi-square error values between flow rate values of the template spectra multiplied by the polynomial and flow rate values of the spectra to be measured; and finding corresponding minimum Chi-square error and corresponding redshift for each of the template spectra, so as to determine classifications of the spectra to be measured.

In still another aspect, the present disclosure provides a system for processing astronomical survey data, comprising a cluster management workstation and a plurality of computing nodes;

the cluster management workstation delivers a spectral data file to be processed to a distributed file system, divides the spectral data file to be processed into a plurality of data blocks, and distributes the plurality of data blocks to the plurality of computing nodes;

each of the computing nodes performs a spectral classification of spectra to be measured in the data blocks, with a template matching method in which template spectra are superposed with a polynomial and then matched with the spectra to be measured, and stores a spectral classification result; the template matching method satisfies the following formula:

$f_m \times \Sigma_{i=0}^{n} \beta_i W^i = f_o$, which is expressed with the following matrix:

$$X \times B = f_o;$$

Wherein $f_o$ represents a flow rate value of a spectrum to be measured, $f_m$ represents a flow rate value of a template spectrum, and $\Sigma_{i=0}^{n} \beta_i W^i$ represents the polynomial, wherein $\beta_i$ represents a coefficient of the polynomial, $W^i$ represents a variable in a wavelength direction in the polynomial, n represents an order of the polynomial; X is a matrix expression of a product of the variables $W^i$ in the wavelength direction in the polynomial and $f_m$, and B is a matrix expression of the coefficient $\beta_i$ in the polynomial;

each of the computing nodes performs the following steps through a computer program:

reading the template spectra, and extracting a template universal operator which comprises at least one of the following operators: a value of a matrix $X = [f_m W^n\ f_m W^{n-1} \ldots f_m W^2\ f_m W\ f_m]$, a value of a transposition $X^T$ of the matrix X, and a value of a product $X^T X$ of the transposition $X^T$ and the matrix X;

reading the spectra to be measured;

performing spectral matching by redshifting the spectra and translating redshifts in a predetermined shift step length, and computing Chi-square error values between flow rate values of the template spectra multiplied by the polynomial and flow rate values of the spectra to be measured; and finding corresponding minimum Chi-square error and corresponding redshift for each of the template spectra, so as to determine classifications of the spectra to be measured.

In yet another aspect, the present disclosure provides a computer storage medium which stores a computer program thereon, wherein the computer program implements the steps of the above method when being executed by a processor.

The present disclosure completes the spectral classification using a distributed parallel computing framework and in conjunction with a direct matrix solution method for polynomial coefficients, and has the characteristics of low cost, simple maintenance and strong expandability, so that the processing speed of the astronomical survey data is greatly improved.

Additional advantages, objectives, and features of the present disclosure will be set forth in part in the description below, and in part will become apparent to those of ordinary skill in the art upon examination the following text, or may be learned from practice of the present disclosure. The objectives and other advantages of the present disclosure can be realized and attained by the structure particularly pointed out in the written description and claims hereof as well as the accompanying drawings.

DETAILED DESCRIPTION OF THE PREFERRED EMBODIMENTS

Figure 1:
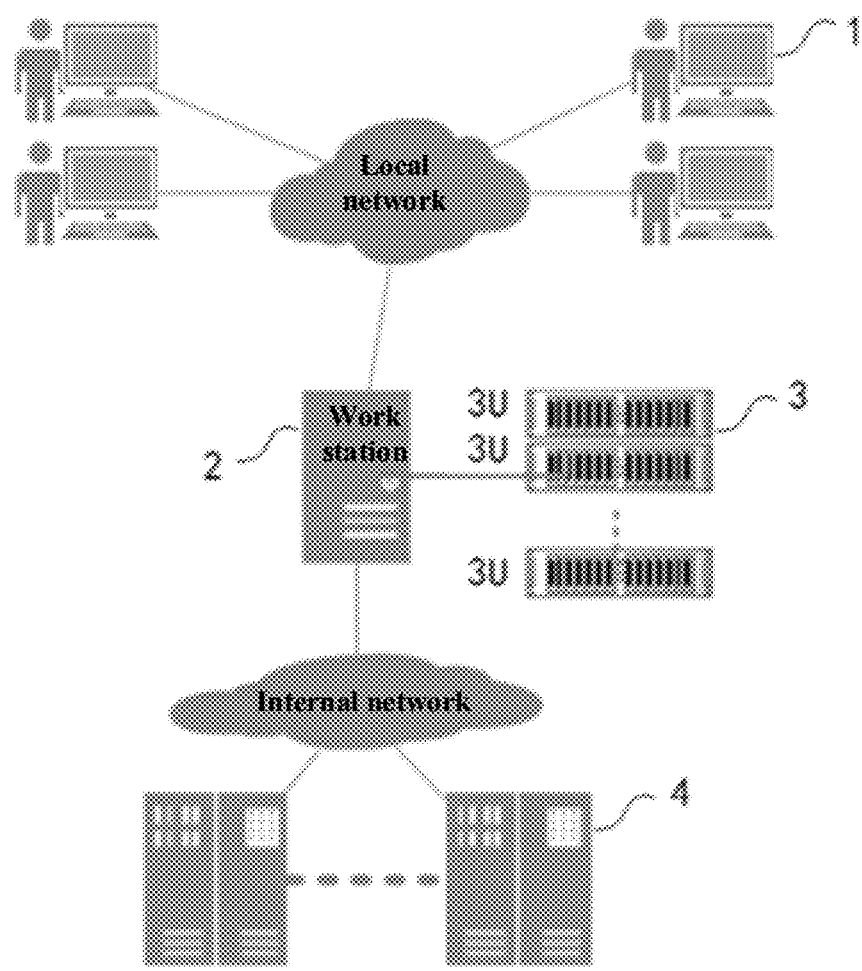
FIG. 1 is a schematic diagram of a traditional architecture for processing survey data of astronomical telescope.

In order that the objectives, technical solutions and advantages of the present disclosure are clearer, the embodiments of the present disclosure will be further described in detail as follows with reference to the drawings. Here, the illustrative embodiments of the present disclosure and the description thereof are used to explain the present disclosure, rather than limitations to the present disclosure.

Here, it should also be noted that in order to avoid obscuring the present disclosure due to unnecessary details, only the structures and/or processing steps closely related to the solutions of the present disclosure are illustrated in the drawings, and other details not very related to the present disclosure are omitted.

It should be emphasized that the term 'comprise/include/have' as used herein refers to the presence of features, elements, steps or components, but does not exclude the presence or addition of one or more other features, elements, steps or components. Here, it should be noted that unless otherwise specified, the term 'connection' can mean not only a direct connection, but also an indirect connection with an intermediate.

With the generation of massive survey data, the traditional computing method of the survey data has shortcomings to some extents in the processes of data reading and data computation. If only a single workstation is adopted for computation, the work usually cannot be completed in an acceptable time, while if a multi-threaded processing mode based on a plurality of independent workstations is adopted, the processing mode usually lead to the problems such as uneven distribution, difficulty in result processing, and so on, and the processing time is still too long. Moreover, this working mode has no data sharing and real-time disaster recovery mechanism, which brings certain risks to the post-processing of data.

That is to say, with the increase of the amount of astronomical survey data, the traditional processing methods cannot meet the demand, and how to process these survey data quickly and effectively is a problem urgently to be solved by the present disclosure.

With regard to the problems existing in the traditional processing methods for astronomical telescope survey data, the present disclosure proposes a solution for realizing high-speed and stable survey data processing using a distributed computing framework. The solution also provides a new computing method for future astronomical data processing.

The distributed computing framework (e.g., HADOOP™, SPARK™, STORM™, etc.) is a computing architecture rapidly developed in recent years, which is implemented by a distributed system. The distributed system can decompose the large-scale data computing task, manage the decomposed data unifiedly by a cluster resource manager, then distribute the decomposed data to a plurality of computing nodes for processing, and finally merge and output computing results. The computing architecture can efficiently use the computing resources, greatly reduce the working time and improve the working efficiency. Moreover, the distributed computing framework provides a good data sharing and backup disaster recovery mechanism, and ensures the accuracy in the process of massive data processing.

In the embodiment of the present disclosure, a parallel computing framework is applied to the computation of astronomical survey data, the implementation process of template matching in 1D Pipeline of LAMOST survey data processing is studied, and a solution is proposed for the problem occurring in the operation process. Next, the astronomical survey data processing process implemented on the parallel computing framework Spark will be taken as an example to explain the present disclosure.

Figure 2:
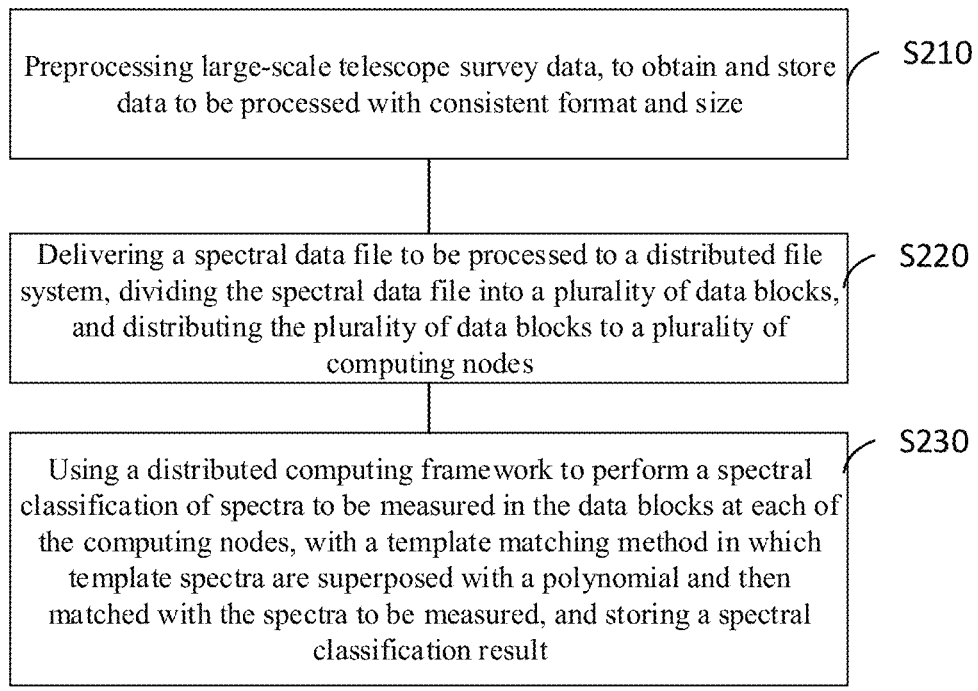
FIG. 2 is a schematic flowchart of a method for processing survey data of astronomical telescope according to an embodiment of the present disclosure.

FIG. 2 is a schematic flowchart of a method for processing astronomical survey data according to an embodiment of the present disclosure. As illustrated in FIG. 2, the method comprises the steps of:

Step S210: preprocessing large-scale telescope survey data, to obtain and store data to be processed with consistent format and size.

The step of preprocessing may be carried out on either a common computer, or a computer of a distributed computing system. specifically, the step of preprocessing may comprise: extracting information of survey file data, and formatting the extracted information to obtain the file to be processed.

The data generated after a telescope observation is usually stored in a file format of Flexible Image Transport System (FITS). FITS is a conventional data format in astronomy, and it is specially designed for exchanging data between different platforms. In the present disclosure, the FITS file data to be processed is taken as an example of the survey data of a large-scale telescope (such as Guo Shoujing telescope).

The FITS file is composed of a file header and spectral data. The file header stores a description of the file, such as observation time, observation object, photographing temperature, exposure time, etc. Meanwhile, a field of view, an accuracy and the like of the observation may also be indicated in the file header, for the later data analysis.

In the embodiment of the present disclosure, extracting information of survey file data comprises: reading survey file data in a format of FITS, and extracting FITS header information and spectral data. After the information of survey file data is extracted, the extracted information may be formatted. For example, the FITS header information and the spectral data are merged into one piece of spectral information, and a plurality of pieces (e.g., every 100,000 pieces) of spectral information are stored into one file (file to be processed). This operation can reduce the times of file reading, and read 100,000 pieces of spectral information at one time, thereby greatly improving the operation speed.

Step S220: reading the stored data (file to be processed) and distribute the read data to a plurality of computing machines for computing processing.

Figure 3:
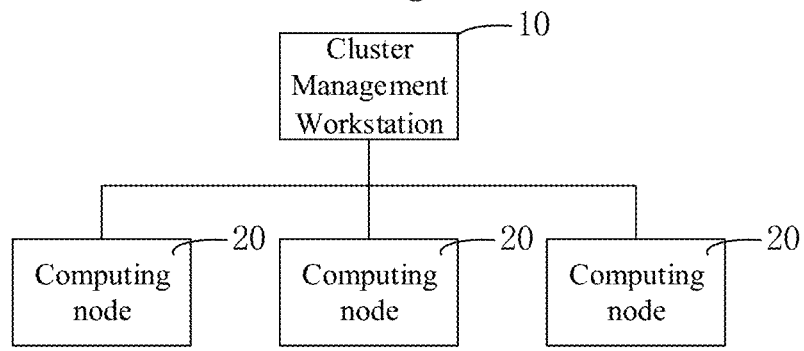
FIG. 3 is a schematic block diagram of a distributed system.

This step can be implemented by a distributed computing system, and specifically, by a cluster management workstation in the distributed computing system. As illustrated in FIG. 3, the distributed computing system may comprise a cluster management workstation 10 and a plurality of computing nodes (or called computer nodes) 20. The cluster management workstation 10 is configured to perform a unified management of the distributed system, distribute data to be processed to a plurality of computer nodes for parallel processing, and merge and output computing results. The cluster management workstation 10 may be used as a computing node for computing processing of data. In the embodiment of the present disclosure, both the cluster management workstation 10 and the computing node 20 are installed with a computer program for realizing a distributed computation, and the cluster management workstation 10 further has an additional management authority in addition to the function of the computing node.

A user may deliver the preprocessed file to be processed to a distributed file system (e.g., a Hadoop Distributed File System, HDFS) of the cluster management workstation 10 by a wired transmission or a wireless transmission, and set a file backup level. Here, HDFS is just an example, and the distributed file system may also be other system, such as Alluxio, Apache Cassandra, etc., and the present invention is not limited thereto.

After the file to be processed is delivered to the distributed file system (e.g., HDFS), each large file to be processed may be divided into a plurality of data blocks by setting the file system, so that the cluster management workstation can evenly distribute the data blocks to a plurality of computing devices (such as high-performance computing nodes). In the embodiment of the present disclosure, the large file to be processed may be divided according to a predetermined granularity, and the data blocks thus obtained may be further divided into smaller data blocks according to a smaller granularity, so as to redistribute the data blocks among the computing nodes according to a difference in computing speed of each of the computing nodes.

In the embodiment of the present disclosure, the division of the large file to be processed by setting the distributed file system may be performed based on a predetermined number parameter of the data blocks or a predetermined size parameter of the data blocks, and the file to be processed may be evenly divided into data blocks of a predetermined number based on the predetermined number parameter, or evenly divided into data blocks of a predetermined size based on the predetermined size parameter.

The distributed file system has recoverability and disaster resistance, both of which can be guaranteed by storing a plurality of copies. Different numbers of copies may be set as needed, and setting of the number of copies (backups) may be realized by a configuration file of the distributed system. For example, when an attribute dfs.replication in a configuration file hdfs-site.xml is set to 1, it means that the file backup number in the file system is 1. That is to say, each file in the file system has two copies, which are distributed on different machines, respectively. If one of the copies is lost, a real-time disaster recovery can be realized through the other copy, so a reading failure will not occur. One backup of experimental data is generally enough to make the system operate normally, but in actual uses, two or more backups may also be made according to the number of machines and the data requirement. When the attribute dfs.replication in the configuration file hdfs-site.xml is set to 2, it means that the file backup number in the file system is 2.

In the embodiment of the present disclosure, the file backup number in the distributed file system is set to 1, and the files in the system are shared and used by all machines through the internal network, thereby greatly improving the convenience of computation.

Step S230: performing a spectral classification of the data in the data blocks with a template matching method on each of computing devices (computing nodes), and storing a spectral classification result.

In this step, the spectra to be matched are redshifted within a certain range, then each of the template spectra is multiplied by a polynomial and compared with the spectra to be matched in the data block (i.e., to perform template matching) to compute their Chi-square error values. A template type with the minimum Chi-square error value is determined as a spectral type of the spectrum to be measured, and corresponding redshift value is that of the spectrum to be measured. In the above process, the redshift range of each spectrum is from −0.004 to 0.004 Å, within which 37 points (1g values of the redshift) are taken averagely, and a shift step length is about 0.0002 Å.

In the embodiment of the present disclosure, a plurality of pieces of template information is extracted, and a template storage is made according to a predetermined format. For example, 183 stellar spectra which are the same as 1D Pipeline may be used for template matching, i.e., 183 templates are extracted at the same time and stored in a format of 'name, flux', wherein name records a spectrum type and flux is a spectral flow rate value. Here, 183 templates are only exemplary, while the present disclosure is not limited thereto, and other number of templates is possible.

In the embodiment of the present disclosure, a fourth-order polynomial fitting spectrum is preferably used for template matching. The traditional method is to obtain a polynomial coefficient by a least square method, which takes a long time and is not conducive to parallel computations under the distributed framework. In the embodiment of the present disclosure, in order to improve the operation speed, the polynomial coefficient value is obtained using an extended matrix. The ideal state of template matching is to obtain a spectrum of a target to be measured by superimposing a template spectrum with a polynomial shape. The principle of template matching by a polynomial computation in the embodiment of the present disclosure is shown in the following formula (1-1).

$$f_m \times \Sigma_{i=0}^{n} \beta_i W^i = f_o \qquad (1\text{-}1)$$

In the formula (1-1), $f_m$ represents a flow rate value of a template spectrum m, $f_o$ represents a flow rate value of a spectrum to be measured, and $\Sigma_{i=0}^{n} \beta_i W^i$ represents a polynomial, wherein $\beta_i$ represents a coefficient of the polynomial, $W^i$ represents a variable in a wavelength direction in a variable computation of the polynomial, and n represents an order of the polynomial. If the formula (1-1) is written in a matrix form, then:

$$[f_m W^n \quad f_m W^{n-1} \quad \ldots \quad f_m W^2 \quad f_m W \quad f_m] \times \begin{bmatrix} \beta_n \\ \beta_{n-1} \\ \ldots \\ \beta_2 \\ \beta_1 \\ \beta_0 \end{bmatrix} = f_o;$$

which is simplified into $X \times B = f_o$, wherein $$X = [f_m W^n \quad f_m W^{n-1} \quad \ldots \quad f_m W^2 \quad f_m W \quad f_m], \quad B = \begin{bmatrix} \beta_n \\ \beta_{n-1} \\ \ldots \\ \beta_2 \\ \beta_1 \\ \beta_0 \end{bmatrix},$$

and wherein X is a matrix expression of a product of the variables $W^i$ and $f_m$ in the wavelength direction in the polynomial, and B is a matrix expression of the coefficient $\beta_i$ in the polynomial.

In this method, it is preferable that n=4; of course, n may also take a larger or smaller value; and when n=4 (i.e., a fourth-order polynomial is adopted), the polynomial is expanded to $\beta_0+\beta_1 W+\beta_2 W^2+\beta_3 W^3+\beta_4 W^4$. The corresponding formula (1-1) when n=4 is drafted in a form of matrix, then a formula (1-2) can be obtained:

$$[f_m W^4 \quad f_m W^3 \quad f_m W^2 \quad f_m W \quad f_m] \times \begin{bmatrix} \beta_4 \\ \beta_3 \\ \beta_2 \\ \beta_1 \\ \beta_0 \end{bmatrix} = f_o \quad (1\text{-}2)$$

Assuming $X = [f_m W^4 \quad f_m W^3 \quad f_m W^2 \quad f_m W \quad f_m]$, $$B = \begin{bmatrix} \beta_4 \\ \beta_3 \\ \beta_2 \\ \beta_1 \\ \beta_0 \end{bmatrix}, y = f_o, \text{ then}$$

$$X \times B = y \quad (1\text{-}3)$$

For the formula (1-3), based on the basic formula for solving the linear regression equation using a direct matrix solution method, the following formula (1-4) is obtained:

$$B=(X^T X)^{-1} X^T y \quad (1\text{-}4)$$

Figure 4:
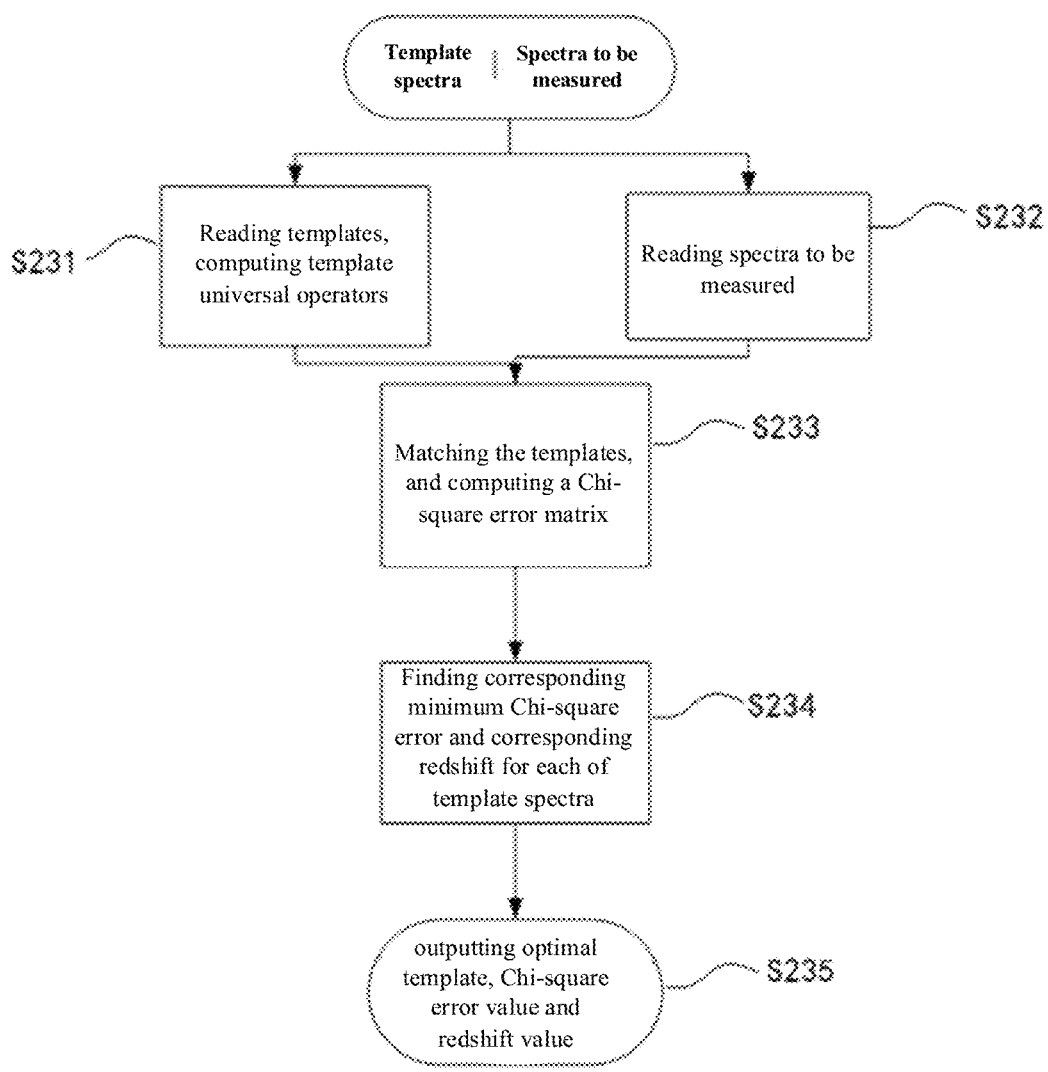
FIG. 4 is a schematic diagram of a computing flow under a distributed computing framework Spark according to an embodiment of the present disclosure.

In order to improve the efficiency, assuming $\hat{X}=[X_1, X_2, \ldots, X_{183}]$ (wherein 183 is the number of templates, and $X_1, X_2, \ldots, X_{183}$ satisfies the formula (1-4)) to represent a three-dimensional matrix formed by 183 matrices $X_1, X_2, \ldots, X_{183}$; taking the place of X, $\hat{X}$ is brought into the formula (1-4) to compute the polynomial coefficients of 183 templates at one time, and stored them in a form of matrix. Next, the Chi-square errors between the templates multiplied by the polynomial and the spectra to be matched are computed. The template with the minimum Chi-square error and the corresponding redshift are taken as the template type and redshift value of the spectra to be matched. The computing flow of the survey data under the distributed computing framework Spark is shown in FIG. 4. As illustrated in FIG. 4, the flow comprises:

Inputting the spectra to be matched and the template spectrum. For each of computing devices, the information of the spectral to be matched may be that distributed to the data block; and Outputting the matching result (including the spectrum type, the redshift and the minimum Chi-square error value).

Operations performed to obtain the matching result comprise:

Step S231: extracting 183 template spectra, computing universal operators based on the template spectra and storing the universal operators in a broadcast variable.

The information of the template spectra can be used to compute the universal operator. The wavelength range of the template spectra is between 3864.56 Å and 8994.98 Å. Since the signal-to-noise ratios at both ends of the spectra are poor, a wavelength range between 3900 Å and 8900 Å is taken as the wavelength range of template matching in the embodiment of the present disclosure. Products of the spectra flow rate value of each template and the first to fourth power of corresponding wavelength values are $(f_m W^4, f_m W^3, f_m W^2, f_m W, f_m)$, thereby obtaining a value of a matrix $X=[f_m W^4 f_m W^3 f_m W^2 f_m W f_m]$, a value of a transposition $X^T$ of the matrix, and a value of a product $X^T X$ of the transposition and the matrix. These values are used repeatedly in every computation by each of the computing nodes, so they are computed in advance as universal operators, stored in a broadcast variable sc.broadcast ( ) and transmitted to each of the computing nodes. The broadcast variable will be kept in the cache of the actuator of each of the computing nodes until the end of the computation, and it can be reused in a plurality of computations.

Step S232: reading the spectrum to be measured.

Step S233: performing template matching and computing a Chi-square error matrix.

Specifically, within the redshift range from −0.004 Å to 0.004 Å, the spectra to be matched are translated in a predetermined shift step length (e.g., about 0.0002 Å) (38 times in total, but the present disclosure is not limited thereto), and the wavelength is interpolated to the same as that of the template. In this example, the linear interpolation is adopted, because the template has a same source as the spectrum to be measured in the example, and the wavelengths are substantially consistent except that some calculation errors are introduced. If the wavelengths are the same, there is no change after the interpolation. If a wavelength difference between the template and the spectrum to be measured is relatively large, a spline interpolation may be adopted.

Next, the flow rate values of the template spectra are multiplied by the fourth-order polynomial, and the Chi-square error values for flow rate values of 183 template spectra multiplied by the polynomial and the flow rate values of the spectra to be matched after one redshift are computed at the same time. The 183 Chi-square errors each time computed are stored as a vector into the matrix. Since the spectra to be matched are translated 38 times according to the predetermined shift step length, 38 computations are made in total, and a Chi-square error matrix with 183 rows and 38 columns is obtained, wherein each column of the matrix represents Chi-square errors of the 183 templates under corresponding redshift.

Step S234: finding corresponding minimum Chi-square error and corresponding redshift for each of the template spectra.

Figure 5:
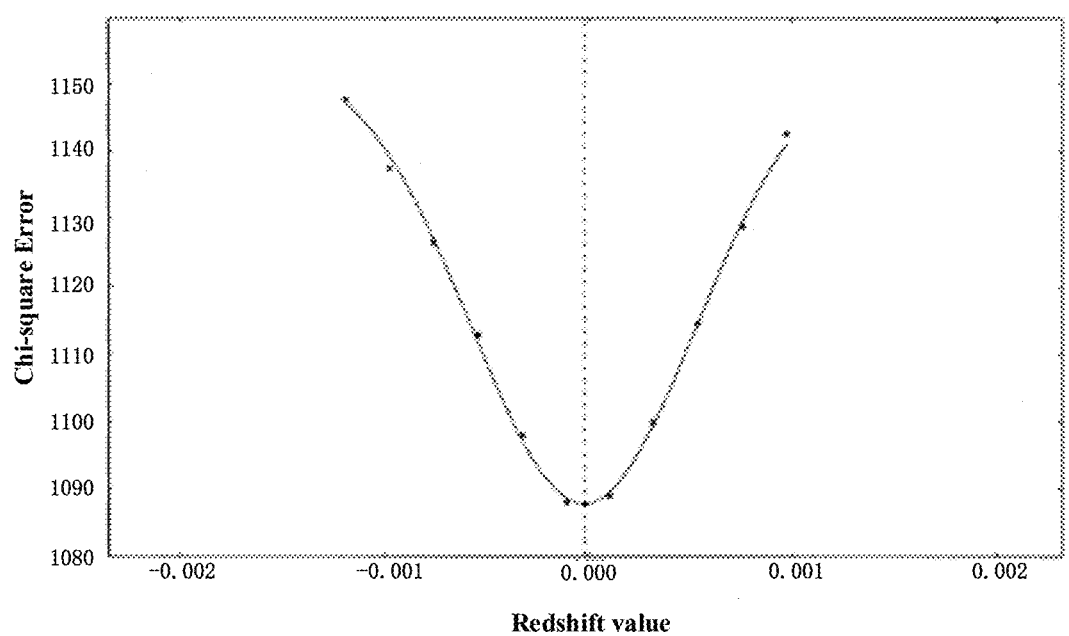
FIG. 5 is an example of a Gaussian fitting curve of Chi-square errors obtained according to an embodiment of the present disclosure.

Specifically, since the Chi-square errors of the spectra near the actual redshift point are in form of Gauss curve, for each of the template spectra, a point with a minimum Chi-square error among 38 redshift points and a predetermined number (such as 10) of points nearby with Chi-square error are selected for Gaussian fitting, as illustrated in FIG. 5.

obtaining the Gaussian fitting curve which best meets the Gaussian curve, and taking corresponding template as the optimal template matching with the spectra to be measured. Based on the lowest point of the Gaussian fitting curve of the matched template, corresponding minimum Chi-square error and corresponding redshift value are obtained.

Step S236: summarizing (merging) computing results and storing them in the HDFS file system.

Specifically, the results in the distributed file system are copied locally using a copy command of the distributed file system. These files may be summarized and analyzed, and the results may be stored in a system database.

Based on the above method, the present disclosure adopts 183 stellar spectra which are the same as 1D Pipeline to perform template matching, for totally 3,177,232 spectra of A, F, G and K types in released data of the survey data DR3 of the experimental Guo Shoujing telescope, improves the template matching algorithm using the characteristics of distributed computation, and adopts the matrix computation instead of the singular value decomposition to compute the polynomial coefficients, thereby better utilizing the computing architecture of Spark. The result shows that the data processing speed under the distributed system is about 78 times that without using the system, and is improved by nearly two orders of magnitude, while the accuracy of the result is within the allowable error range. The comparison between the test results and the 1D Pipeline result of the Guo Shoujing telescope shows that an average difference in spectral pattern is 1.43 subtypes (each spectrum can be further divided into digital subtypes ranging from 0 to 9), and an average error of redshift is 0.000014 Å. The following table is a detailed comparison of error results. The present disclosure provides a new direction for processing Guo Shoujing telescope survey data.

TABLE 1

Example of Experimental Results

| Subtype | Number of spectra | Subtype difference | Redshift difference (Å) |
|---|---|---|---|
| A | 45825 | 1.01 | 0.000022 |
| F | 988811 | 1.63 | 0.000018 |
| G | 1600086 | 1.36 | 0.000013 |
| K | 542510 | 1.31 | 0.000017 |
| ALL | 3177232 | 1.43 | 0.000014 |

To sum up, the present disclosure completes the spectral classification using a conventional computer and a distributed parallel computing framework Spark, in conjunction with a direct matrix solution method for polynomial coefficients, and has the characteristics of low cost, simple maintenance and strong expandability, so that the processing speed of the astronomical survey data is greatly improved.

Accordingly, the present disclosure also provides an apparatus for processing astronomical survey data, which corresponds to computing nodes, and is adopted to implement the above method for processing astronomical survey data in a distributed management system. The apparatus may comprise a processor and a memory, wherein the processor is configured to implement the following steps when executing computer program code stored on the memory:

performing a spectral classification of spectra to be measured in data blocks, with a template matching method in which template spectra are superposed with a polynomial and then matched with the spectra to be measured, and storing a spectral classification result; the step comprising:

reading the template spectra, and extracting template universal operators which comprise at least one of the following operators: a value of a matrix $X=[f_m W^n\ f_m W^{n-1} \ldots f_m W^2\ f_m W\ f_m]$, a value of a transposition $X^T$ of the matrix $X$, and a value of a product $X^T X$ of the transposition $X^T$ and the matrix $X$, wherein $f_m$ represents a flow rate value of a template spectrum m, and $W$ represents a variable in a wavelength direction in a polynomial;

reading the spectra to be measured;

performing spectral matching by redshifting the spectra and translating redshifts in a predetermined shift step length, and computing Chi-square error values for flow rate values of the template spectra multiplied by the polynomial and flow rate values of the spectra to be measured;

finding corresponding minimum Chi-square error and corresponding redshift for each of the template spectra, determining the optimal template matching with the spectra to be measured by Gaussian curve fitting, so as to determine classifications of the spectra to be measured.

For more specific implementation examples, please refer to the foregoing description, which will not be repeated here.

Accordingly, the present disclosure further provides a system for processing astronomical survey data, as illustrated in FIG. 3, which comprises a cluster management workstation 10 and a plurality of computing nodes 20;

the cluster management workstation delivers a spectral data file to be processed to a distributed file system, divides the spectral data file to be processed into a plurality of data blocks, and distributes the plurality of data blocks to the plurality of computing nodes;

each of the computing nodes performs a spectral classification of spectra to be measured in data blocks, with a template matching method in which template spectra are superposed with a polynomial and then matched with the spectra to be measured, and stores a spectral classification result; each of the computing nodes performs the following steps through a computer program:

reading the template spectra, and extracting template universal operators which comprise at least one of the following operators: a value of a matrix $X=[f_m W^4\ f_m W^3\ f_m W^2\ f_m W\ f_m]$, a value of a transposition $X^T$ of the matrix $X$, and a value of a product $X^T X$ of the transposition $X^T$ and the matrix $X$, wherein $f_m$ represents a flow rate value of a template spectrum, and $W$ represents a variable in a wavelength direction in a polynomial;

reading the spectra to be measured;

performing spectral matching by redshifting the spectra and translating redshifts in a predetermined shift step length, and computing Chi-square error values between flow rate values of the template spectra multiplied by the polynomial and flow rate values of the spectra to be measured;

finding corresponding minimum Chi-square error and corresponding redshift for each of the template spectra, determining the optimal template matching with the spectra to be measured by Gaussian curve fitting, so as to determine classifications of the spectra to be measured.

The embodiments of the present disclosure complete the spectral classification using a distributed parallel computing framework, in conjunction with a direct matrix solution method for polynomial coefficients, and has the characteristics of low cost, simple maintenance and strong expandability, so that the processing speed of the astronomical survey data is greatly improved.

It should be understood by those of ordinary skill in the art that the exemplary constituent parts, systems and methods described in conjunction with the embodiments disclosed herein can be implemented in hardware, software or a combination thereof. Whether the implementation is in hardware or software depends on the specific application and the design constraints of the technical solution. Professionals can use a different method to implement the described function for each specific application, but such implementation should not be considered beyond the scope of the present disclosure. When the implementation is in hardware, it may be, for example, an electronic circuit, an Application Specific Integrated Circuit (ASIC), appropriate firmware, a plug-in, a function card, etc. When the implementation is in software, the elements of the present disclosure are programs or code segments used to perform required tasks. The programs or code segments may be stored in a machine-readable medium, or transmitted over a transmission medium or a communication link through data signals carried in carriers. The 'machine-readable medium' may include any medium capable of storing or transmitting information. Examples of the machine-readable medium include an electronic circuit, a semiconductor memory device, am ROM, a flash memory, an erasable ROM (EROM), a floppy disk, a CD-ROM, an optical disk, a hard disk, an optical fiber medium, a Radio Frequency (RF) link, and the like. The code segments may be downloaded via a computer network such as the Internet, an intranet, etc.

The present disclosure further relates to a non-transitory computer storage medium, which stores computer-executable instructions capable of performing the method in any of the above method embodiments, wherein the storage medium may be a magnetic disk, an optical disk, a read-only memory (ROM), a memory, a Random Access Memory (RAM), a Flash Memory, an electrically programmable ROM, an electrically erasable programmable ROM, a register, a Hard Disk (HDD) or a Solid-State Drive (SSD), a removable disk, a CD-ROM, or a storage medium of any other form known in the art. The storage medium may also include combinations of the above memories.

It should also be noted that the exemplary embodiments mentioned in the present disclosure describe some methods or systems based on a series of steps or apparatuses. However, the present disclosure is not limited to the order of the above steps, i.e., the steps may be performed in an order mentioned in the embodiments, or in an order different therefrom, or several steps may be performed concurrently.

The specific embodiments further make detailed explanations to the objectives, technical solutions and advantageous effects of the present disclosure. It should be understood that those described above are only specific embodiments of the present disclosure and are not intended to limit the protection scope of the present disclosure. Any modification, equivalent substitution or improvement made within the spirit and principle of the present disclosure should fall within the protection scope of the present disclosure.

The invention claimed is:

1. A spectral classification method for astronomical survey data of a spectroscopy telescope, comprising:
    a data preprocessing step: reading survey file data in a format of Flexible Image Transport System (FITS), extracting FITS header information and spectral data from the survey file data, formatting the extracted information by merging the FITS header information and the spectral data into one piece of spectral information, and storing a plurality of pieces of spectral information into a spectral data file to be processed;
    a data distribution step: delivering the spectral data file to be processed to a distributed file system by a wired transmission or a wireless transmission, dividing the spectral data file to be processed into a plurality of data blocks, and distributing the plurality of data blocks to a plurality of computing nodes;
    a data computing step: using a distributed computing framework including the plurality of computing nodes to perform a spectral classification of spectra to be measured in the data blocks at each of the computing nodes, with a template matching method in which template spectra are superposed with a polynomial and then matched with the spectra to be measured, and storing a spectral classification result;
    the template matching method satisfies the following formula:
    $f_m \times \Sigma_{i=0}^{n} \beta_i W^i = f_o$, which is expressed with the following matrix:

$X \times B = f_o$;

wherein $f_o$ represents a flux value of the spectrum to be measured, $f_m$ represents a flux value of the template spectrum, and $\Sigma_{i=0}^{n} \beta_i W^i$ represents the polynomial, wherein $\beta_i$ represents a coefficient of the polynomial, $W^i$ represents a variable in a wavelength direction in the polynomial, n represents an order of the polynomial; X is a matrix expression of a product of the variables $W^i$ in the wavelength direction in the polynomial and $f_m$, and B is a matrix expression of the coefficient $\beta_i$ in the polynomial;
    wherein the data computing step comprises:
        reading the template spectra, and extracting template universal operator(s) which comprise at least one of the following operators: a value of a matrix $X = [f_m W^n \ f_m W^{n-1} \ \ldots \ f_m W^2 \ f_m W \ f_m]$, a value of a transposition $X^T$ of the matrix X, and a value of a product $X^T X$ of the transposition $X^T$ and the matrix X;
        reading the spectra to be measured;
        performing spectral matching by redshifting the spectra to be measured and translating redshifts in a predetermined shift step length, and computing Chi-square error values between the flux values of the template spectra multiplied by the polynomial and the flux values of the spectra to be measured; and
        finding a corresponding minimum Chi-square error and a corresponding redshift for each of the template spectra, and determining classifications of the spectra to be measured to implement survey of stars based on the determined classifications of the spectra,
    wherein finding the corresponding minimum Chi-square error and the corresponding redshift for each of the template spectra comprises:
        for each of the template spectra, finding a redshift point with the minimum Chi-square error and a predetermined number of redshift points nearby with Chi-square errors for Gaussian fitting; and
        obtaining a Gaussian fitting curve which best meets a Gaussian curve, and taking a corresponding template as the template matching with the spectra to be measured, to obtain the minimum Chi-square error and a corresponding redshift value based on a lowest point of the Gaussian fitting curve of the matched template.

2. The method according to claim 1, wherein the step of dividing the spectral data file to be processed into a plurality of data blocks comprises: dividing the spectral data file to be processed into a plurality of data blocks according to a predetermined granularity, and further dividing the plurality of data blocks into smaller data blocks according to a smaller granularity, so as to redistribute the data blocks among the computing nodes according to a difference in computing speed of each of the computing nodes.

3. The method according to claim 2, wherein a wavelength range between 3900 Å and 8900 Å is taken as the wavelength range of template matching.

4. The method according to claim 1, further comprising:
    storing the extracted template universal operators as a broadcast variable, and transmitting to each of the computing nodes.

5. A non-transitory computer storage medium which stores a computer program thereon, wherein the computer program implements the steps of the method according to claim 1, when being executed by a processor.

6. The method according to claim 1, wherein the distributed computing framework is a Spark computing framework.

7. A spectral classification system for astronomical survey data of a spectroscopy telescope, comprising a cluster management workstation and a plurality of computing nodes;
wherein the cluster management workstation obtains a spectral data file to be processed and delivers the spectral data file to be processed to a distributed file system by a wired transmission or a wireless transmission, divides the spectral data file to be processed into a plurality of data blocks, and distributes the plurality of data blocks to the plurality of computing nodes; wherein the spectral data file to be processed is obtained by: reading survey file data in a format of FITS, extracting FITS header information and spectral data from the survey file data, formatting the extracted information by merging the FITS header information and the spectral data into one piece of spectral information, and storing a plurality of pieces of spectral information into the spectral data file to be processed;
wherein each of the plurality of computing nodes includes a processor and a memory, wherein the processor is configured to implement the following steps when executing computer program code stored on the memory:
performing a spectral classification of spectra to be measured in data blocks, with a template matching method in which template spectra are superposed with a polynomial and then matched with the spectra to be measured, and storing a spectral classification result; the template matching method satisfies the following formula:

$f_m \times \Sigma_{i=0}^{n} \beta_i W^i = f_o$, which is expressed with the following matrix:

$$X \times B = f_o;$$

wherein $f_o$ represents a flux value of the spectrum to be measured, $f_m$ represents a flux value of the template spectrum, and $\Sigma_{i=0}^{n} \beta_i W^i$ represents the polynomial, wherein $\beta_i$ represents a coefficient of the polynomial, $W^i$ represents a variable in a wavelength direction in the polynomial, n represents an order of the polynomial; X is a matrix expression of a product of the variables $W^i$ and $f_m$ in the wavelength direction in the polynomial, and B is a matrix expression of the coefficient $\beta_i$ in the polynomial;
performing a spectral classification of spectra to be measured in data blocks comprises:
reading the template spectra, and extracting template universal operators which comprise at least one of the following operators: a value of a matrix $X = [f_m W^n \ f_m W^{n-1} \ \ldots \ f_m W^2 \ f_m W \ f_m]$, a value of a transposition $X^T$ of the matrix X, and a value of a product $X^T X$ of the transposition $X^T$ and the matrix X;
reading the spectra to be measured;
performing spectral matching by redshifting the spectra to be measured and translating redshifts in a predetermined shift step length, and computing Chi-square error values between the flux values of the template spectra multiplied by the polynomial and the flux values of the spectra to be measured; and
finding a corresponding minimum Chi-square error and a corresponding redshift for each of the template spectra, and determining classifications of the spectra to be measured to implement survey of stars based on the determined classifications of the spectra,
wherein finding the corresponding minimum Chi-square error and the corresponding redshift for each of the template spectra comprises:
for each of the template spectra, finding a redshift point with the minimum Chi-square error and a predetermined number of redshift points nearby with Chi-square errors for Gaussian fitting; and
obtaining a Gaussian fitting curve which best meets a Gaussian curve, and taking a corresponding template as the template matching with the spectra to be measured, to obtain the minimum Chi-square error and a corresponding redshift value based on a lowest point of the Gaussian fitting curve of the matched template.

8. The system according to claim 7, wherein the step of dividing the spectral data file to be processed into a plurality of data blocks comprises dividing the spectral data file to be processed into a plurality of data blocks according to a predetermined granularity, and further dividing the plurality of data blocks into smaller data blocks according to a smaller granularity, so as to redistribute the data blocks among the computing nodes according to a difference in computing speed of each of the computing nodes.

9. The system according to claim 8, wherein a wavelength range between 3900 Å and 8900 Å is taken as the wavelength range of template matching.

10. The system according to claim 8, wherein the cluster management workstation further implements:
storing the extracted template universal operators as a broadcast variable, and transmitting to each of the computing nodes.

11. The system according to claim 7, wherein the distributed computing framework is a Spark computing framework.

* * * * *